United States Patent [19]
Gagliardi

[11] Patent Number: 5,951,392
[45] Date of Patent: Sep. 14, 1999

[54] METHOD FOR CUTTING A FLAT OR ROUND

[75] Inventor: Eugene D. Gagliardi, Atglen, Pa.

[73] Assignee: Visionary Design, Inc., Atglen, Pa.

[21] Appl. No.: 09/158,753

[22] Filed: Sep. 22, 1998

[51] Int. Cl.⁶ .................................................. A22C 17/00
[52] U.S. Cl. .......................................... 452/125; 452/149
[58] Field of Search ................................... 452/125, 127, 452/141, 149

[56] References Cited

U.S. PATENT DOCUMENTS

| | | | |
|---|---|---|---|
| 5,088,957 | 2/1992 | Gagliardi, Jr. | 452/149 |
| 5,266,064 | 11/1993 | Gagliardi, Jr. | 452/149 |
| 5,464,368 | 11/1995 | White, et al. | 452/149 |
| 5,525,103 | 6/1996 | White, et al. | 452/149 |
| 5,667,436 | 9/1997 | Gagliardi, Jr. | 452/149 |

*Primary Examiner*—Willis Little

*Attorney, Agent, or Firm*—Panitch Schwarze Jacobs & Nadel, P.C.

[57] ABSTRACT

A method for cutting a portion of a flat or outside animal round into a plurality of meat products including steaks having substantially enhanced value comprises removing substantially all of a fat layer from the exterior surface of the portion of the animal round. A natural seam on the muscle is located and a cut is made along the seam to divide the portion of the beef round into at least two separate portions, a first portion having coarse grains extending in multiple directions and a second portion having generally parallel grains. Substantially all of the cartilage, membrane, fat, and other non-meat tissue is removed from the outside of the first portion. Substantially all of the cartilage, membrane, fat and other non-meat tissue is also removed from the outside of the second portion. The second portion is tenderized and is then cut across the grain in a direction generally parallel to natural seam into a plurality of steaks, each steak being very low in fat content and of relatively high economic value.

11 Claims, 5 Drawing Sheets

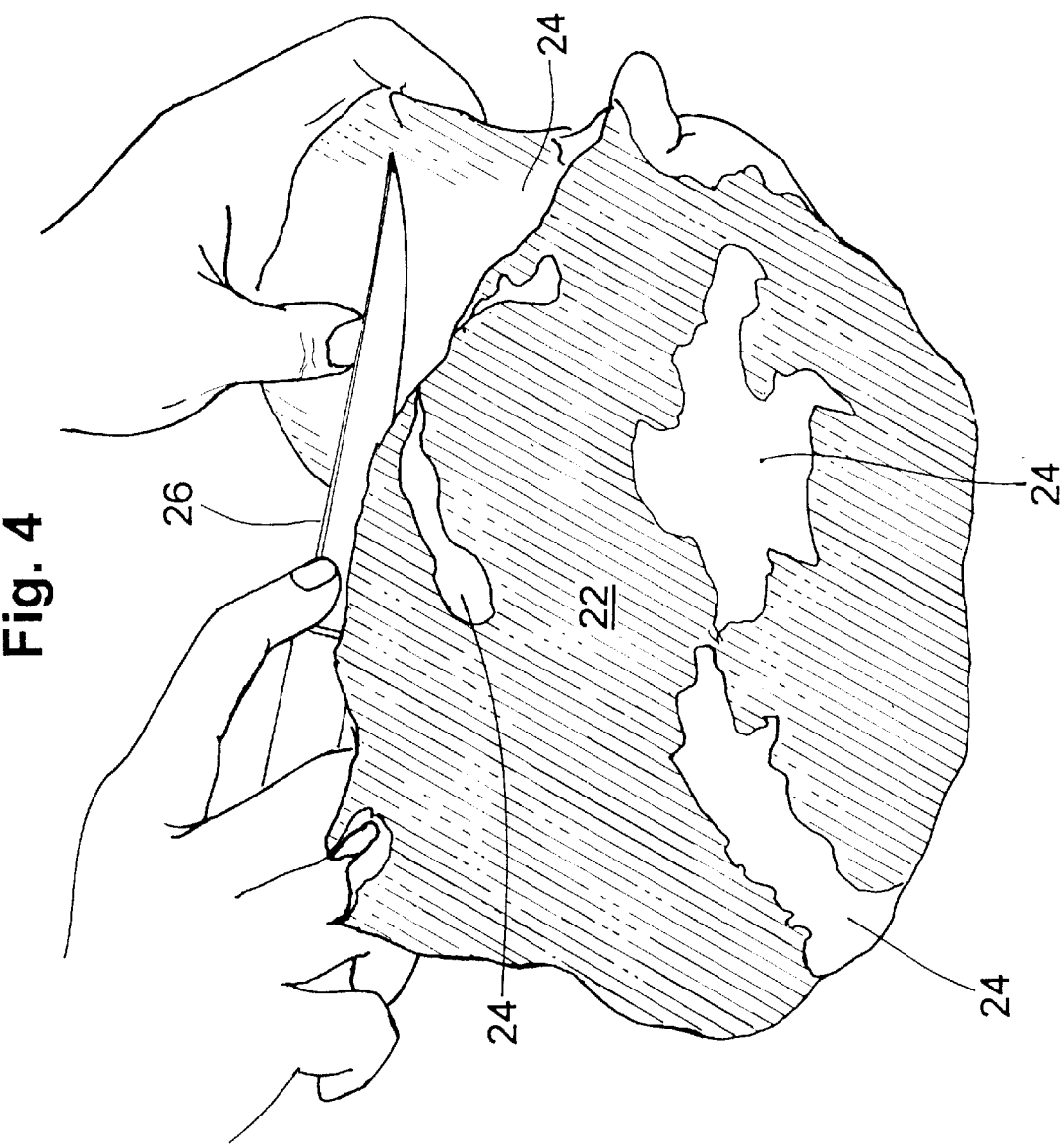

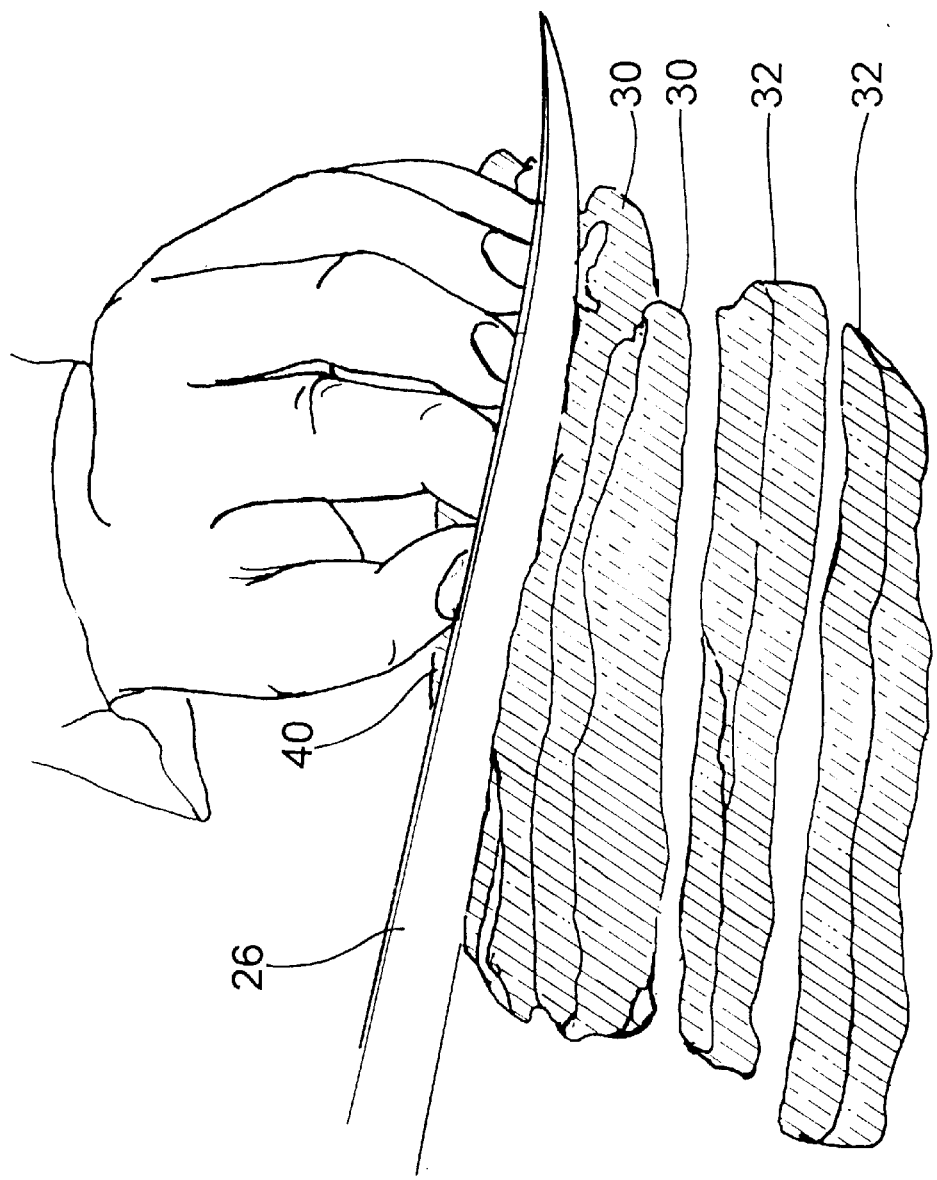

METHOD FOR CUTTING A FLAT OR ROUND

BACKGROUND OF THE INVENTION

The present invention relates generally to a method of cutting an animal carcass into edible meat products and more particularly, to a method of cutting a flat or outside round, into a plurality of steaks or london broils.

The butchering and dressing of animals, such as cattle, for the purpose of producing edible meat or beef products is well known. Animals are butchered into meat products such as rib roasts, sirloin steaks, strip steaks, and the like. Typically, a side or quarter of beef is butchered by a meat cutter cutting or otherwise removing from the standing side or beef quarter as many "high value" beef products as feasible. Such high value beef products include roasts, steaks, and the like. Once the high value cuts or products are removed from the standing side or beef quarter, the products are further processed by deboning, trimming, cleaning, and the like, and are thereafter wrapped and sold for relatively high per pound prices. Such high value cuts include the middle cuts of the carcass including the rib, loin, and sirloin. They are typically considered the most tender and are derived from the most well-protected, less-stressed muscles and have a fine close-grained texture.

Other less desirable or lower value components are also removed from the remainder of the side or beef quarter and sold separately as less valuable roasts. Typically, the lesser desirable components include muscles having coarse grains running in many different directions similar to a cowlick unlike the fine closed grained texture described above. Alternatively, the removed lower value components are placed into a meat grinder along with other components trimmed from the higher value products and converted into ground beef to be sold at a generally lesser price per pound than the per pound price of higher value products. Any meat which goes through a grinder becomes a commodity of lesser quality and cost.

As the cost of bringing beef and other animal products to market has risen, a need has also arisen for obtaining enhanced value from the beef or other animal. One way to provide such enhanced value is to reduce the amount of the beef which sold as a low value roast or is placed in the meat grinder and to sell such beef at a per pound price in excess of the price of the low value roast or ground beef. Muscles cut into steaks and london broils are the most preferred and high value products with steaks and london broils having a fine unidirectional grain being the most popular. Advancements have been made in obtaining some higher value cuts of meat particularly in the area of identifying and removing heretofore previously ignored muscles and extracting from such muscles the cartilage, fat, connective tissue and other non-muscle materials.

One area that until now has been neglected is in the area of the flat or outside round which is located beneath the rump and is part of the leg which is typically an undesirable part. As such, a substantial portion of the outside round is either sold with a considerable amount of fat, connective tissue and other non-muscle material as a single inexpensive roast or is put into the grinder, converted into ground beef, and sold at a substantially lower cost than other products. Also, in addition to the increased cost of bringing beef to market, new demands are also made of butchers and meat producers to produce still more high quality beef with low fat content, often considered to be "heart healthy". This is particularly the situation as fears of dangerous diseases associated with poultry are on the rise. There is a need to provide more high quality cuts of meat.

BRIEF SUMMARY OF THE INVENTION

Briefly stated, the present invention comprises a method for cutting a portion of an animal round into a plurality of individual meat products including steaks having enhanced value. The method comprises the steps of removing a fat layer from the exterior surface of the portion of the animal round, locating and cutting along a natural seam to divide the portion of the round into at least two separate portions including first and second portions wherein the first portion includes coarse grains extending in multiple directions and the second portion includes generally parallel grains. The method also includes removing substantially all of the cartilage, fat, connective tissue, membrane and other non-muscle material from the outer surface of the first and second portions. The method also includes steps of treating the second portion by tenderizing and cutting the second portion across the grain in a direction generally parallel to the natural seam into a plurality of steaks which are very low in fat content and are of relatively high economic value.

BRIEF DESCRIPTION OF THE SEVERAL VIEWS OF THE DRAWINGS

The foregoing summary, as well as the following detailed description of a presently preferred embodiment of the invention, will be better understood when read in conjunction with the appended drawings. For the purpose of illustrating the invention, there is shown in the drawings, an embodiment which is presently preferred. It should be understood, however, that the present invention is not limited to the particular arrangement and instrumentality shown. In the drawings:

FIG. 4 is a perspective view of the second portion illustrating removal of exposed fat and other undesirable elements;

FIG. 5 is a perspective view of the second portion after the fat has been removed and illustrating slicing the second portion into large steaks or london broils wherein the slices are generally cut across the grain in a direction generally parallel to the natural seam of the flat round of FIG. 2;

DETAILED DESCRIPTION OF THE INVENTION

Figure 1:
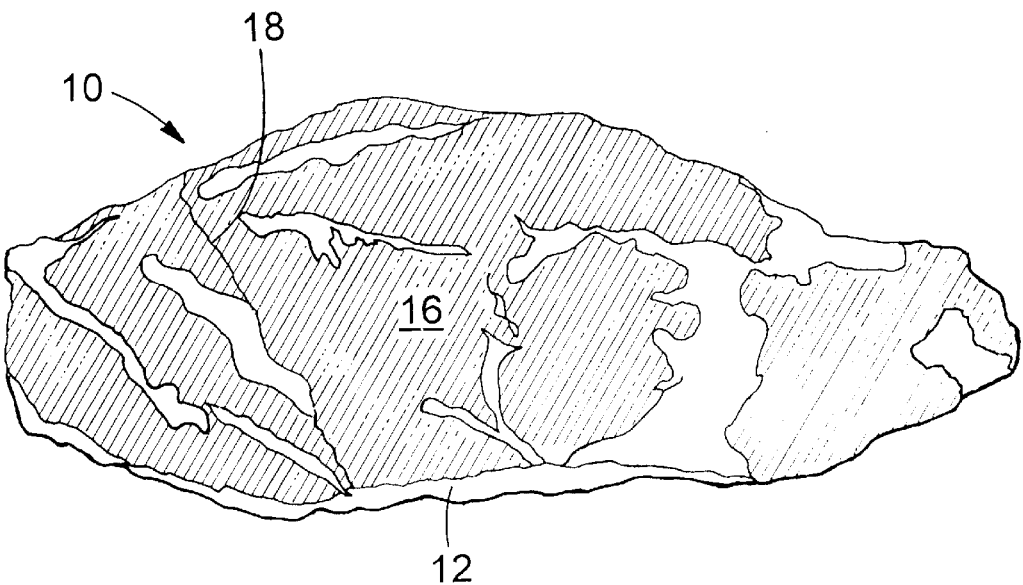
FIG. 1 is a perspective view of a portion of a round of beef with bones being previously removed for use with the present method in providing beef products with enhanced value.

Certain terminology is used in the following description for convenience only and is not limiting. The words, "lower", "upper", "left", and "right" designate directions in the drawings to which reference is made. The terminology includes the words above specifically mentioned, derivatives thereof and words of similar import.

Referring in detail to the drawings, wherein like numerals are used to indicate the same elements throughout the several figures, there is shown in FIG. 1, a perspective view of a substantial portion of a flat or outside beef round 10. As used herein, the flat or outside beef round 10 comprises the heel and most of the round of the animal but does not include the rump, tip or hindshank of the animal. Terms referring to "flat", "outside round", and "round" are used synonymously throughout the description. In addition, as used herein, steaks, london broils, and other like meat products are used synonymously. The round 10 as shown in FIG. 1 is a portion of the animal which is well known to those of ordinary skill in the art. The beef round 10 as shown in FIG. 1 has previously had all bones removed. It will be appreciated by those of ordinary skill in the art that the present invention is not limited to only the round 10 where all of the bones have been removed and that rounds 10 with some or all bones present could be used without departing from the spirit and scope of the invention.

As discussed generally above, the flat or outside round 10 as shown is not presently considered to be high quality beef because the two or more muscles contained within this region are typically treated as one muscle having a coarse grain that extends in many directions similar to a cowlick and also contains a substantial amount of fat, cartilage, membrane, etc. between the seams causing the round 10 to have a coarse texture and to not be very tender. In the prior art, the round 10 would be primarily cut down the middle, trimmed, and tied to form an inexpensive round roast or placed in a grinder to produce ground beef. Due to the relatively high amounts of cartilage, membrane, and the like, such prior art uses are considered to be low economic value uses with the resulting beef products being sold at wholesale or retail for relatively low per pound prices.

The following description of a preferred method of practicing the present invention relates to the boneless flat or outside round 10 of beef as shown in FIG. 1. It will be appreciated by those of ordinary skill in the art that the present invention has equal applicability to flats or rounds obtained from other animals such as sheep, hogs, deer, etc. Thus, while the following description relates specifically to the beef round 10 as illustrated, the invention is not so limited.

The first step in the method of the present invention is to remove all or as much as possible of the fat layer 12 which extends generally around the exterior surface of the beef round 10. Preferably, the fat layer 12 is removed by effectively cutting the fat 12 away from the remainder 16 of the beef round 10 utilizing a sharp boning knife 14 or other suitable sharp tool. The knife 14 is preferably inserted between the fat layer 12 and the remainder 16 of the round 10 beginning at one end of the round 10 with the cut portion of the fat layer 12 being grasped and pulled away from the remainder 16 of the round 10 as the knife 14 is moved from the starting end toward the other end of the round 10. While it is preferable that the fat layer 12 be removed as essentially a single piece, it will be appreciated by those of ordinary skill in the art that the fat layer 12 can be removed in separate segments or pieces, if desired. Preferably, the process of removing the fat layer 12 from the remainder of the round 10 is performed manually with a knife 14 although it will be apparent to those of ordinary skill in the art that the fat layer 12 removal step could be automated or partially automated, if desired. For example, the fat layer 12 could be removed utilizing a wizard knife, a mechanical skinner, or the like. Similarly, although it is preferred that a boning knife 14 be used for manual removal of the fat layer 12, it will be appreciated by those of ordinary skill in the art that any other type of knife or other tool having the requisite strength and cutting edge with the necessary degree of sharpness could be used in the alternative.

Figure 2:
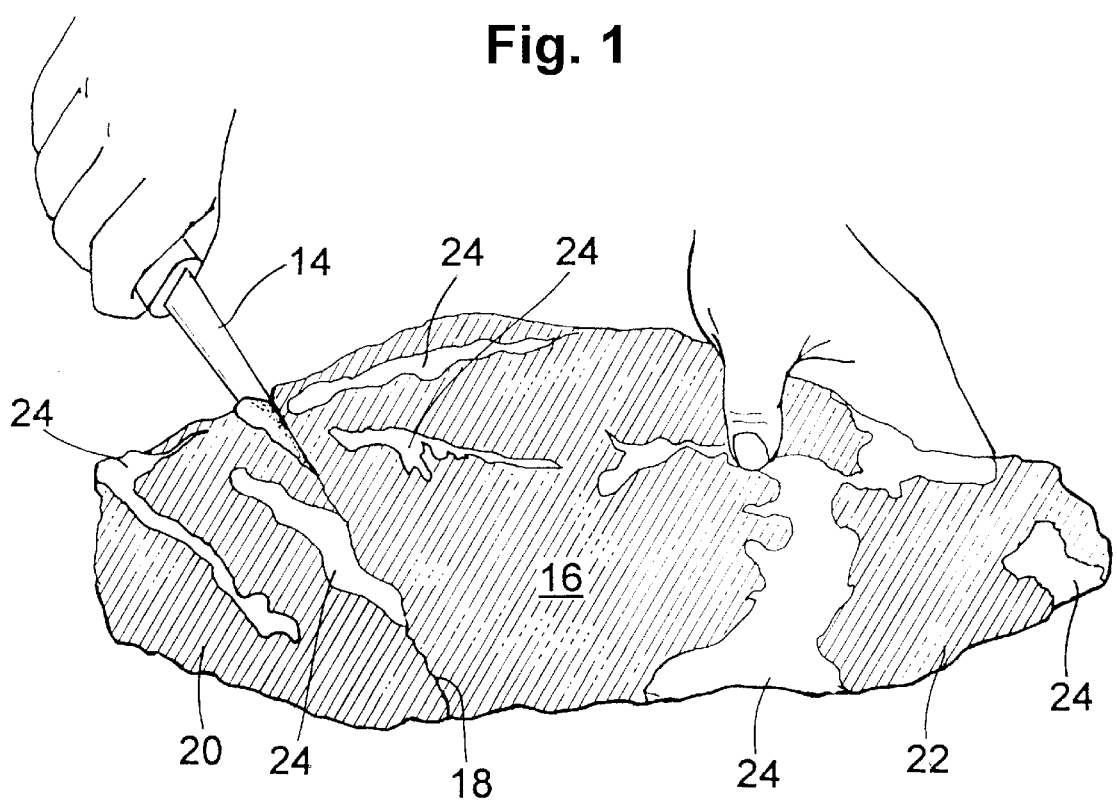
FIG. 2 is a perspective view of the round portion of FIG. 1 with a layer of fat removed from the exterior surface and illustrating cutting along a natural seam within the round portion to separate muscles and form first and second portions.

After the fat layer 12 has been removed, the remainder 16 of the round 10 is preferably oriented as shown in FIG. 2, so that the person (or persons) performing the method is able to identify the various natural seams 18 separating the two principal muscles of the round 10 including a first larger muscle (biceps femoris) and a second smaller muscle (biceps femoris ischiatic-head). The seams 18 are essentially formed of the cartilage, membranes, connective tissues, and other such materials which hold the various muscles together. Referring again to FIG. 2, a first portion or muscle 20 is removed from the remainder 16 of the round 10 (hereinafter identified as the second portion 22) by effectively grasping the second portion 22 and cutting along the seam 18 extending between the first portion 20 and second portion 22. Preferably, the cutting is accomplished utilizing a relatively sharp boning knife 14. However, it will be appreciated by those of ordinary skill in the art that any other type of knife or other sharp tool may alternatively be employed. As the cut is made along the seam 18, the first portion 20 is pulled away from the second portion 22 so that the round 10 is separated into two distinct muscles or portions 20, 22. FIG. 2 shows that the second portion 22 is larger than the first portion 20 however, it will be appreciated by those of ordinary skill in the art that the two portions may be approximately the same size or the first portion 20 may be larger than the second portion 22. For illustrative purposes only and understanding of the method steps described hereinbelow, reference is made to the first portion 20 as being the smaller of the two portions. In addition, it will be appreciated by those of ordinary skill in the art that more than one major natural seam may be present in the beef round 10. In such a situation, both of the natural seams may be cut in the manner described above so that a plurality of portions or muscles may be produced.

Figure 3A:
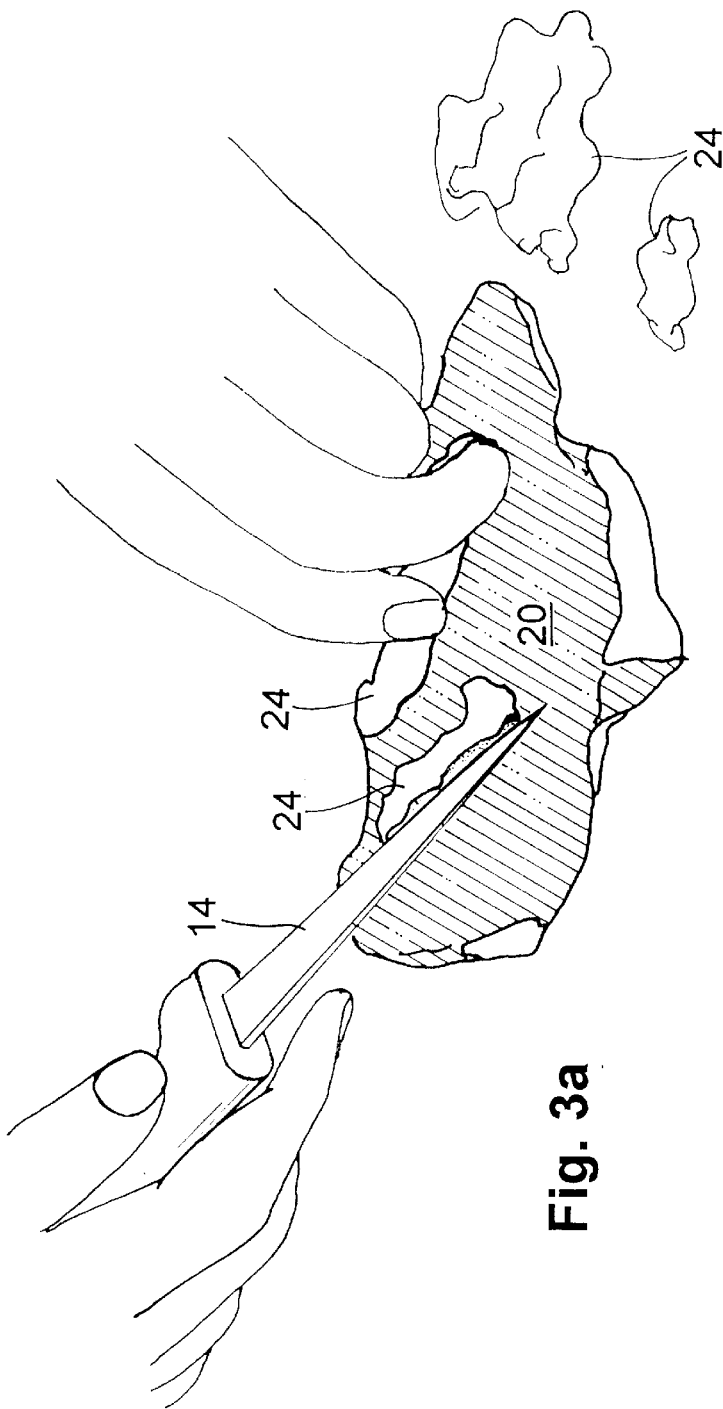
FIG. 3a is a perspective view of the first portion after cutting along the seam and illustrating removal of exposed fat and other undesirable elements.
Figure 3B:
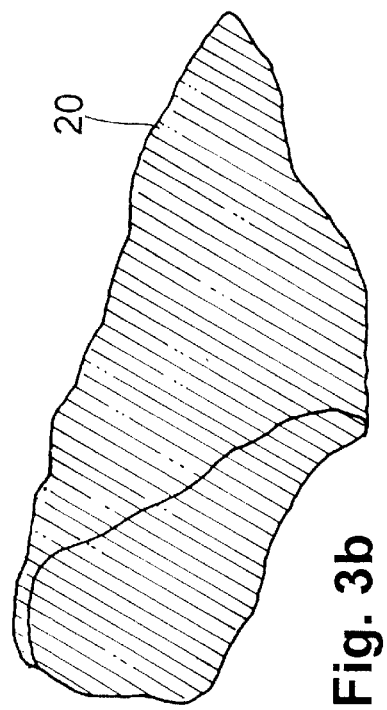
FIG. 3b is a perspective view of the first portion after removal of exposed fat and other undesirable elements.

The next step in the method of the present invention is to denude each portion 20, 22 of the beef round 10 by removing from each portion all of the cartilage, membrane, fat, and other non-meat tissue, generally referred to as "silver" 24 which is present on each of the outer surfaces thereof. FIG. 3a illustrates removal of the silver 24 from one outer surface of the first portion 20 of the round by effectively cutting the silver 24 from the muscle utilizing a sharp boning knife 14. It will be appreciated by those of ordinary skill in the art that any other sharp knife or any other suitable sharp instrument could alternatively be employed for removal of the silver 24. The silver 24 could also be removed in any automated or semi-automated manner, for example, by using a mechanical skinner, or the like. Because the silver 24 generally very tightly engages the muscle, it may be necessary to cut away small portions of the muscle along with the silver 24. FIG. 3b shows the silver 24 being removed from all sides of the first portion resulting in a first portion 20 of meat product which, when denuded, is effectively a pure solid piece of meat. Because the amount of fat present in the first portion is low, the first portion of the round muscle qualifies as being "heart healthy". All of the removed silver with the other meat portions attached may also be put into a grinding machine with the remainder of the round to provide ground beef.

The denuded first portion 20 may thereafter be made into a small roast having a relatively high retail value. The first portion 20 is preferably made into a roast since muscle portion 20 has coarse grains extending in multiple directions and not the fine distinct grains that are most appealing in steak products. The resulting meat product 20 may be further treated with additional steps such as a tenderizing step and/or marinating step prior to being offered for sale. The meat product 20 may also be pickled for sale as corned beef. In addition, the smaller muscle portion 20 may be cut into thin cutlets by cutting across the grain. The preferred tenderizing process involves subjecting the meat product to jacquard needle tenderizing in a manner well known to those skilled in the art. However, it will be appreciated by those of ordinary skill in the art that any other suitable mechanical or non-mechanical tenderizing processes may alternatively be employed. The first portion 20 could also be further cut into other meat products or could be placed in the grinder if desired.

Similarly, the second portion or muscle 22 is substantially denuded by removing from the portion 22, most of the silver 24 which is present on the outer surfaces thereof as shown in FIG. 4. Here again, the silver 24 is removed from the second portion 22 by effectively cutting the silver 24 from the portion 22 utilizing a sharp boning knife 26. It will also be appreciated by those of ordinary skill in the art that any other sharp knife or any other suitable sharp instrument could alternatively be employed for removal of the silver 24. The silver 24 could also be removed in any automated or semi-automated manner, for example, by using a mechanical skinner or the like. Similar to the silver 24 of the first portion 20, the silver 24 is generally very tightly attached to the second portion 22, causing the removal to be performed in small sections. Removal of the silver 24 also removes some of the high quality meat from the second portion 22. Accordingly, all of the removed silver 24 from the second portion 22 with the meat portions attached may also be put into a grinding machine with the remainder of the trim from other areas to form a ground beef.

The second portion 22 is preferably subjected to a tenderizing step prior to being further processed. The preferred tenderizing process involves subjecting the meat product to jacquard needle tenderizing in a manner well known to those skilled in the art. The tenderizing step is applied to each side of the second portion 22. In addition, the tenderizing step may be repeated several more times to ensure the tenderness of the second portion 22. Although it is preferred that jacquard needle are used for all of the tenderizing steps, it will be appreciated by those of ordinary skill in the art that any other suitable mechanical or non-mechanical tenderizing processes may alternatively be employed.

The second portion 22 has grains which are generally parallel so that the second portion 22 may be sliced across the grain and generally parallel to the seam 18 or cut line where the two portions or muscles 20, 22 were separated. FIG. 5 shows that a plurality of slices 30 may be made along the length of the second portion 22 to produce a plurality of large heart healthy boneless steaks or london broils 32. Preferably, the steaks 32 are each approximately one inch to 1.5 inch thick with a small amount of fat covering the exterior surface so that a typical second portion 22 of the round 10 results in the creation of about five such steaks 32 in addition to an end of the second portion 22 identified as the heel 40. The five large steaks 32 may also be further divided into two parts (not shown) resulting in ten smaller steaks.

Figure 6:
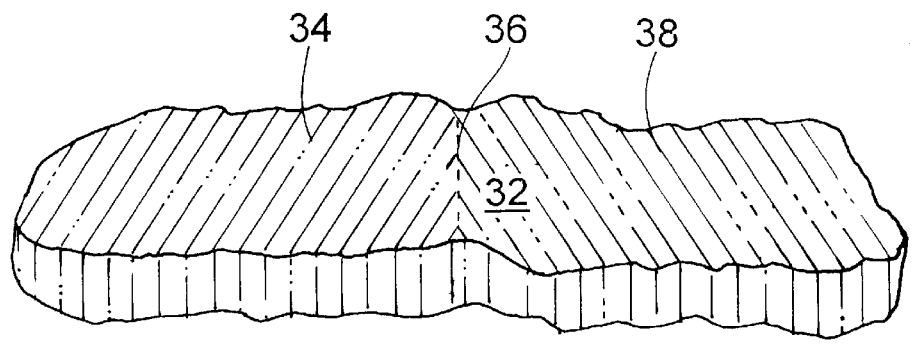
FIG. 6 is a perspective view of a large steak.

Referring to FIG. 6, each of the steaks 32 has a uniquely defined grain similar to a cow lick wherein the grain extends in one direction 34 along a line 36 and then extends another way 38 on the other side of the line 36. In addition, the steaks 32 are generally seamless and have in interior that is fat- or silver-free.

Figure 7:
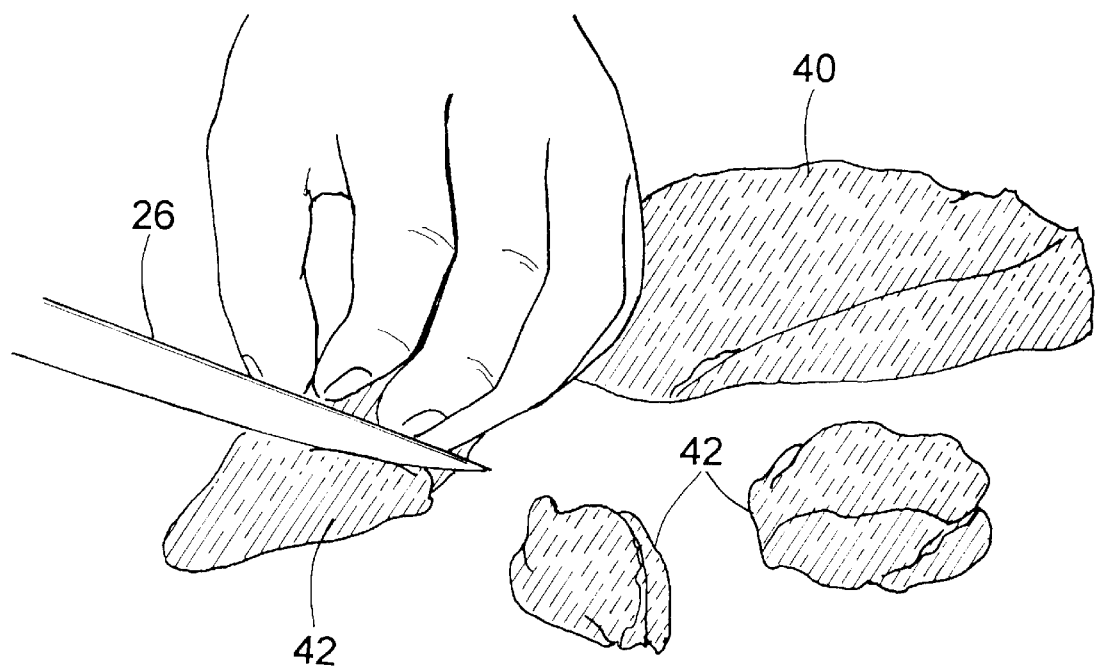
FIG. 7 is a perspective view of the heel from the second portion of the flat round of FIG. 5 being cut into cubes.

Referring to FIG. 7, the end portion or heel 40 of the second portion may be cut into smaller pieces 42 for use in stew or kebabs, etc. The pieces 42 may also be further needled for tenderness and may be marinated.

It will be appreciated by those of ordinary skill in the art that the above-described method is highly effective in converting what would normally be relatively low per pound priced beef or other meat products into a series of relatively high per pound priced products. The high priced beef or other meat products resulting from the present invention are boneless and are generally considered to be "heart healthy" because they contain only a minimum amount of fat. The present invention can thus be employed for adding substantial economic value to a flat or outside round.

It will also be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for cutting a portion of an animal round into a plurality of meat products including steaks having substantially enhanced value, the method comprising the steps of:

removing a layer of fat from the exterior surface of the portion of the animal round;

locating and cutting the portion of the round along a natural seam into at least two separate portions, a first portion and a second portions, wherein the first portion includes coarse grains extending in multiple directions and the second portion includes generally parallel grains;

removing substantially all of the cartilage, membrane, fat, and other non-meat tissue from the outside of the first portion;

removing substantially all of the cartilage, membrane, fat and other non-meat tissue from the outside of the second portion;

tenderizing at least the second portion; and cutting the second portion across the grain in a direction generally parallel to the natural seam into a plurality of separate steaks, each such steak being very low in fat content and of relatively high economic value.

2. The method according to claim 1 wherein the tenderizing step is performed by a mechanical tenderizing apparatus.

3. The method according to claim 2 wherein the mechanical tenderizing apparatus comprises a needle tenderizing apparatus.

4. The method according to claim 1 wherein all of the steps except for the tenderizing step are performed manually.

5. The method according to claim 4 wherein the removing and cutting steps are each performed using a knife.

6. The method according to claim 1 wherein the steaks have a predetermined thickness, are essentially seamless, and have a uniquely defined grain.

7. The method according to claim 6 wherein the thickness of each steak is approximately between one inch and 1.5 inches.

8. The method according to claim 1 further comprising the step of cutting a third portion from the second portion adjacent the plurality of meat products to provide a heel.

9. The method according to claim 8 wherein the heel is cut into small, generally bite-sized pieces used for cubes, kebabs, and the like.

10. A steak made in accordance with the method of claim 1.

11. A meat product made in accordance with the method of claim 9.

* * * * *